United States Patent
Heuser

(10) Patent No.: US 10,399,261 B2
(45) Date of Patent: Sep. 3, 2019

(54) METHOD AND DEVICE FOR PRODUCING A PIPE LINING

(71) Applicant: resinnovation GmbH, Ruelzheim (DE)

(72) Inventor: Mirko Heuser, Ruelzheim (DE)

(73) Assignee: resinnovation GmbH, Ruelzheim (DE)

( * ) Notice: Subject to any disclaimer, the term of this patent is extended or adjusted under 35 U.S.C. 154(b) by 243 days.

(21) Appl. No.: 15/292,881

(22) Filed: Oct. 13, 2016

(65) Prior Publication Data

US 2017/0028603 A1 Feb. 2, 2017

Related U.S. Application Data

(63) Continuation-in-part of application No. 15/203,450, filed on Jul. 6, 2016.

(30) Foreign Application Priority Data

Jul. 10, 2015 (DE) .................. 10 2015 212 964

(51) Int. Cl.
- *B29C 45/00* (2006.01)
- *B29C 45/14* (2006.01)
- *B29C 45/77* (2006.01)
- *F16L 55/1645* (2006.01)
- *F16L 55/165* (2006.01)
- *B29K 105/16* (2006.01)
- *B29L 23/00* (2006.01)

(52) U.S. Cl.
CPC ........ *B29C 45/14622* (2013.01); *B29C 45/77* (2013.01); *F16L 55/1653* (2013.01); *F16L 55/16455* (2013.01); *B29C 2945/76006* (2013.01); *B29C 2945/76498* (2013.01); *B29K 2105/16* (2013.01); *B29L 2023/22* (2013.01)

(58) Field of Classification Search
CPC .......... B05D 7/22; B05D 7/222; B05D 7/225; B29C 45/14622; F16L 55/16455; F16L 55/1653
USPC ........................................ 427/230; 264/36.16
See application file for complete search history.

(56) References Cited

U.S. PATENT DOCUMENTS

| | | | | |
|---|---|---|---|---|
| 3,122,786 A | * | 3/1964 | Huisman ................ | B05D 7/222 118/408 |
| 3,288,171 A | * | 11/1966 | Hucks, Jr. .............. | B05D 7/222 106/703 |

(Continued)

FOREIGN PATENT DOCUMENTS

| | | |
|---|---|---|
| AT | 398818 B | 2/1995 |
| FR | 2893973 A1 | 6/2007 |
| WO | 2015049041 A1 | 4/2015 |

OTHER PUBLICATIONS

Bertrand Dauvergne, European Search Report for EP application 16176647.2, dated Nov. 4, 2016.

*Primary Examiner* — Nathan H Empie
(74) *Attorney, Agent, or Firm* — Greer, Burns & Crain, Ltd.; Steven P. Fallon

(57) ABSTRACT

The invention concerns a device and a method for producing a pipe lining in a pipe by introduction of a hardenable mass, wherein the mass is pumped through an outlet into an annular gap, which is formed by the pipe wall and the device arranged in the pipe. The device has a former, which is guided within the pipe in a predetermined spacing from the pipe wall along the pipe axis, so that the annular gap between the pipe wall and the former has a predetermined cross-section.

9 Claims, 2 Drawing Sheets

(56) References Cited

U.S. PATENT DOCUMENTS

| | | | |
|---|---|---|---|
| 4,691,728 A * | 9/1987 | Mathison | F16L 55/16455 137/15.11 |
| 4,716,053 A * | 12/1987 | Eskijian | B05C 7/08 118/408 |
| 5,779,948 A | 7/1998 | Perkins et al. | |
| 2011/0076397 A1 * | 3/2011 | Rauch | B05C 7/08 427/230 |
| 2011/0297243 A1 | 12/2011 | Kiest, Jr. | |

* cited by examiner

METHOD AND DEVICE FOR PRODUCING A PIPE LINING

PRIORITY CLAIM AND REFERENCE TO RELATED APPLICATION

This application is a continuation-in-part of and claims priority under 35 U.S.C. 120 from prior pending U.S. application Ser. No. 15/203,450, which was filed on Jul. 7, 2016, which application claims priority under 35 U.S.C. 119 from prior German Application DE 102015212964.0, which was filed on Jul. 10, 2015.

FIELD

A field of the invention is pipes and pipe linings. The invention concerns methods and devices for producing a pipe lining in a pipe by introducing a hardenable mass.

BACKGROUND

AT 398 818 B describes a cylindrical smoothing body for producing a pipe lining in a pipe, which for centering is attached behind a centering slide, which is pulled through the pipe. At the end, which is adjacent to the centering slide, the smoothing body has a gasket, which sealingly lies on the pipe inner wall. The annular gap formed between the smoothing body and the pipe inner wall is pumped full with hardening synthetic resin mass, in particular until reaching a pressure, which indicates the complete filling of the gap, before the smoothing body is pulled further. A tubular film can be applied onto the inner side of the synthetic resin mass after further movement of the smoothing body.

US 2011/0297243 A1 describes the lining of a pipe without a woven tube pre-impregnated with resin in such a way that a hose-shaped bubble, which is impinged with inner pressure, progressively turns within a pipe, while a hardenable mass is applied by means of a distributor onto the turning end of the bubble. Therein the progressively turning bubble presses the mass against the pipe wall. After hardening of the mass between the pressurized bubble and the pipe wall, the bubble can be removed.

A disadvantage of this method is that the bubble continuously exerts a pressure onto the mass and can press the mass into holes provided in the pipe wall, which can lead to an irregular cross-section of the mass. Another disadvantage is that the method requires access to both ends of the pipe section to be lined.

SUMMARY OF THE INVENTION

An embodiment of the invention is a method for manufacturing a pipe lining in a pipe by introducing a hardenable mass, which is pumped through at least one outlet into an annular gap, which is formed by the pipe wall and a former that is spaced apart therefrom, wherein the former is moved along its longitudinal axis with its first end ahead along the pipe wall, wherein before the introduction of the hardenable mass into the pipe, a hose sleeve is inserted into the pipe and the annular gap is formed between the hose sleeve and the former.

An embodiment of the invention is a device for use in a method for producing a pipe lining in a pipe by introduction of a hardenable mass, wherein the device has a former, which in a first radius about its longitudinal axis has a forming surface and at its first end has a wall with a sealing edge, which is arranged in a second radius to the longitudinal axis, which is larger than the first radius, with at least one outlet discharging at the first end for feeding the hardenable mass to the forming surface, having at least one spacer which is spaced apart from the first end, which spacer extends from the former up into the second radius, which is equal to the radius of the pipe wall.

Figure 1:
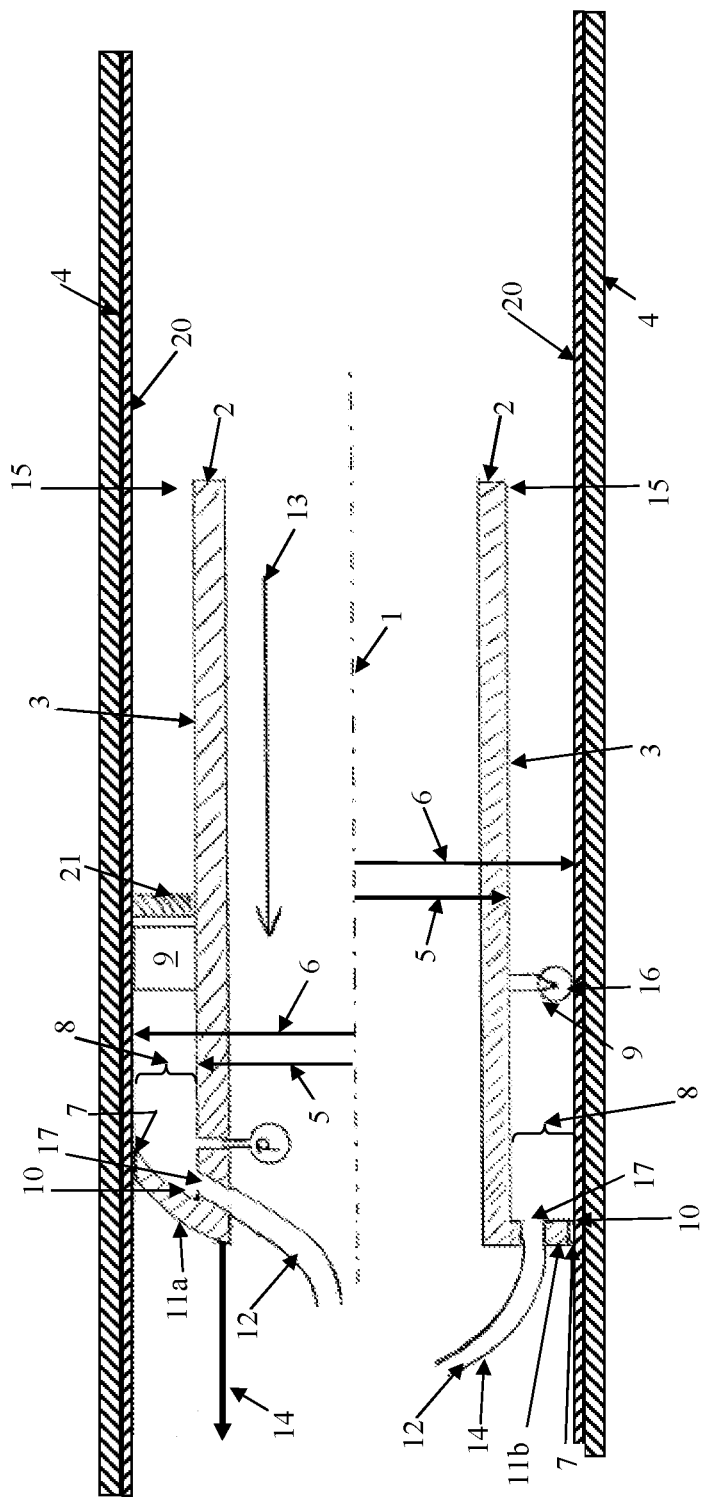
FIG. 1 two embodiments of the device,
FIG. 2 a method and
FIG. 3 an embodiment of the method.

| LIST OF REFERENCE NUMERALS: | |
|---|---|
| 1 | longitudinal axis |
| 2 | former |
| 3 | forming surface |
| 4 | pipe wall |
| 5 | first radius |
| 6 | second radius |
| 7 | sealing edge |
| 8 | annular gap |
| 9 | spacer |
| 10 | first end |
| 11, 11a, 11b | wall |
| 12 | feed line |
| 13 | direction of movement |
| 14 | traction means |
| 15 | second end |
| 16 | travelling wheel |
| 17 | outlet |
| 18 | mixer |
| 19, 19a, 19b | delivery pipe |
| 20 | hose sleeve |
| 21 | ring disk |
| 22 | hardenable mass |
| 23 | support |
| P | pressure sensor |

DESCRIPTION OF THE PREFERRED EMBODIMENTS

The invention concerns a method for producing a pipe lining in a pipe, which can be fixed, for example can be laid in the earth, by introduction of a hardenable mass. The method allows the use of a mass, which is admixed with a starter, so that it hardens readily within a short time. Generally, the method allows the use of hardenable masses, which harden without starting the hardening by increased temperature and/or irradiation, in particular without irradiation and at ambient temperature. The method also allows the use of high-filled hardenable masses and can be carried out without woven fabrics or non-woven fabrics.

The invention can provide a method for producing a pipe lining and a device, which can be used to this purpose, wherein the method preferably needs no holding time, while the pipe lining is pressed over its whole length against the pipe for hardening by pressure impingement.

The invention provides a device and a method for producing a pipe lining in a pipe by introduction of a hardenable mass, wherein the mass is pumped through an outlet into an annular gap, which is formed by the pipe wall and the device arranged in the pipe. The device has a former, which is guided in a predetermined spacing from the pipe wall along the pipe axis. The former is guided within the pipe in a predetermined spacing from the pipe wall along the pipe axis, so that the annular gap between the pipe wall and the former has a predetermined cross-section.

The mass is held by the former against the pipe wall. Due to the fact that the former is guided resp. moved longitudinally along the pipe wall, the hardenable mass can harden in the annular gap until it is inherently stable and then, when the former is further moved longitudinally along the pipe wall and away from a section of the hardenable mass, forms the pipe lining in an inherently stable manner.

The annular gap between the pipe wall and the former preferably has the same circumferential cross-section, resp. the former is circumferentially arranged at the same spacing from the pipe wall.

The device has an outlet for the mass, to which at least one feed line for the mass is connected and which discharges onto the forming surface of the former facing towards the pipe wall. The mass is pumped through the outlet between the former and the pipe wall and held by the former adjacent to the outlet against the pipe wall, while the former is guided at a predetermined spacing longitudinally along the pipe wall. Accordingly, the pipe lining produced has a cross-section, which is equal to the cross-section of the annular gap between the pipe wall and the former.

The outlet is, for example, formed by a plurality of partial outlets or an annular outlet, which is connected to a first end of the former.

The former, resp. its forming surface, is arranged from its longitudinal axis on in a first radius, wherein the spacing of the first radius from the pipe wall, which is in a second radius, determines the radius of the annular gap. At the first end of the former a wall with a sealing edge is arranged, which closes the annular gap at the first end against the pipe wall. Therefore, a hardenable mass that is pumped through the outlet into the annular gap cannot flow out over the first end of the former resp. cannot flow out from the annular gap at the first end.

The device can be adapted to the cross-section of the pipe to be lined, e.g. by forming the wall with a sealing edge corresponding to the second radius, in which the pipe wall lies and of the former resp. of its forming surface facing towards the pipe wall that is smaller by a spacing than the second radius in a first radius. The wall with sealing edge and the former resp. its forming surface can have independently from one another e.g. a polygonal cross-section, in particular an oval or round cross-section. Preferably, the wall with sealing edge has a second radius, which is slidable in respect to the pipe wall, e.g. frictionally engaged to the pipe wall, and preferably has a shape equal to the cross-section of the pipe to be lined, while the former has a forming surface, which has a smaller first radius, so that the forming surface has a cross-section, which, independently of the radial extension of the wall with sealing edge, has a smaller cross-section. The cross-section of the forming surface in the first radius with a spacing from the cross-section of the sealing edge, which is in the second radius, can be e.g. oval or round, or have the reduced cross-section of the sealing edge. The description of the device and the method with respect to round cross-sections is therefore also representative of other cross-sections. The sealing edge is preferably arranged in a frictionally engaged manner against the pipe wall, e.g. by the sealing edge being loaded against the pipe wall. The sealing edge can e.g. be loaded against the pipe wall by the wall at the first end of the former being formed in an elastic manner and bringing the sealing edge, in the unloaded state, in which the device is not arranged in the pipe to be lined, into a radius larger than the first radius, so that in a state loaded by the pipe wall in which the device is arranged within the pipe to be lined, the sealing edge is arranged in a spring-loaded manner against the pipe wall resp. against the hose sleeve introduced into the pipe. This way, the sealing edge can, in the unloaded state, be in a radius, which is larger by up to 20%, preferably up to 10% or to 5% or to 2% than the first radius.

The former preferably has a circumferentially closed cylindrical surface. The surface of the former can, for example, be formed by a pipe section, alternatively by overlapping lamellae, which extend, for example, parallel or at an acute angle or approximately perpendicular to the longitudinal axis of the pipe, or which extend perpendicularly or at an acute angle or perpendicularly to the longitudinal axis of the pipe.

At a spacing from the sealing edge, the former is preferably brought to a predetermined spacing from the pipe wall by at least one spacer arranged at a predetermined spacing from the first end. Such a spacer extends from the former approximately up into the second radius, which is equal to the radius of the pipe wall. The spacer can abut in a frictionally engaging manner and/or with a load against the pipe wall and e.g. without any load by arrangement in the pipe resp. against the pipe wall, for example, up into a radius, which is by up to 20%, preferably up to 10% or to 5% or to 2% larger than the second radius, in which the pipe wall is arranged.

For the movement of the former along the tube, the former is e.g. pulled along the tube, e.g. by a traction means, which engages at its first end, e.g. in the area of the first radius or in the area of the longitudinal axis.

Preferably, the former has two or more spacers, which are distributed on its circumference, e.g. at least 3 spacers that are uniformly distributed over the circumference.

The at least one spacer can be rigid or elastic and optionally can have a terminally arranged travelling wheel. A spacer can be formed as a pin, which protrudes over the former, for example shaped in the form of a screwed-in bolt, e.g. a screw. Alternatively, the spacer, which protrudes over the former, resp. extends over the first radius, is sheet-shaped, with the narrow side facing towards the first end resp. the sealing edge. A spacer can extend along the radius of the former or be inclined at an angle against the radial line of the former, in order to achieve e.g. a certain spring effect for the former against the pipe wall.

Guiding resp. moving the former during the method along the pipe wall resp. along the pipe axis causes the mass to harden in the annular gap between the first end and the opposite second end of the former, wherein the degree of hardening, which is achieved at the second end, is sufficient at least for the inherent stability of the mass, whereas hardening until final stability can take place also after moving the second end of the former away from the mass.

The spacers are arranged in an axial section adjacent to the first end of the former, in which the mass is still sufficiently flowable to flow around the spacers during the movement of the former along the pipe and to subsequently merge. The former therefore is to be moved with such a speed along the pipe that the mass passes the spacers prior to the end of the processing time. The former has therefore a length, which is sufficient to hold the mass until stripping time, since the mass is then inherently stable. To accelerate hardening of the mass after it has flown around the at least one spacer, the former can be heated in a section between the at least one spacer and its second end, and/or the resin can be pre-heated, e.g. to 60 to 80° C., in particular to 60 to 70° C., and pumped via insulated and/or heated delivery pipes into the former.

Due to the movement of the former along the pipe, the mass experiences a relative movement along the former from its first end to its second end, while the mass increasingly hardens. Therefore, during its relative movement along the second end of the former, the mass has a sufficient inherent stability, which forms a closure of the annular gap at the second end. Therefore, the mass is held between the sealing edge at the first end of the former and the hardened mass at the second end of the former in the annular gap between the former and the pipe wall, while the former is moved along the pipe.

The sealing edge can be formed by the feed line, which feeds the hardenable mass to the first end of the former. Alternatively, the sealing edge can be formed by a wall, which is arranged circumferentially around the former at the first end of the former. The feed line, which can optionally be subdivided into two or more feed lines, which are preferably distributed over the circumference of the former, can be arranged in the area of the sealing edge and/or in the area located on the wall of the former. Preferably, the at least one outlet, to which a feed line resp. a sub-line of the feed line is connected, is arranged at the first end of the former between the second and the first radius.

The method has the advantage to form a pipe lining with a predetermined cross-section, since this cross-section is adjusted by the predetermined spacing between the former and the pipe wall, in particular by the forming surface arranged in the first radius and the sealing edge arranged in the second radius as well as by the spacers. Accordingly, the method can also form a lining having the predetermined cross-section for smaller holes or cavities in or behind the pipe wall, since the annular gap between the former and the pipe wall remains essentially the same during hardening. In contrast, a method, in which pressure is continuously applied to a mass against the pipe wall, which is filled between a bubble arranged longitudinally with respect to the pipe and the pipe wall, does not always create a liner with constant thickness, since the mass can be pressed into recesses until the bubble abuts on the pipe wall, without provision of a compensation for the mass in the recesses.

In its circumference the former can have a continuous surface, for example, in the form of a pipe section. Alternatively, the former can have overlapping lamellae or stripes, which extend essentially parallel to its longitudinal axis. Such lamellae or stripes can be displaceable against each other and are preferably spring-loaded from inside in order to be arranged in an elastic manner in a second radius, for example, by a compressible cylindrical element, which is arranged in the former.

The device, in particular a wall at the first end, the sealing edge and the former independently from one another can consist of metal, for example, sheet metal, and/or of plastics. Preferably, a wall and/or feed line at the first end, the sealing edge and the former and at least one spacer attached thereto are connected in a pressure-tight manner with one another.

In the method, prior to the introduction of the hardenable mass, a hose sleeve is inserted into the pipe, which hose sleeve preferably abuts on the pipe wall at least after insertion of the hardenable mass. In this embodiment, the hose sleeve covers recesses resp. breakthroughs in the pipe to be lined when the mass is inserted into the annular gap between the former and the pipe wall.

Generally, the method has the advantage that the hardenable mass can have a high content of inert fillers, for example, at least 20% by volume, preferably at least 30% by volume, at least 100 or at least 200% by volume with respect to hardening constituents, for example, with respect to reactive constituents, in particular reactive synthetic constituents. Fillers can be selected e.g. among sand, silica sand, quartz flour, talc, calcium carbonate, aluminum hydroxide, glass hollow spheres, fibers, e.g. made of glass, PET (polyethylene terephthalate), Kevlar and/or polyester, carbon fibers, and mixtures of these fillers. Reactive synthetic constituents can be, for example, resins based on epoxies, polyurethane and polyester and mixtures of them. The mass can be e.g. an epoxy mortar, polyester mortar or a cementitious mortar.

As reactive constituent, the hardenable mass can also contain fast-hardening cement. Optionally, it can be provided for in the method that a ring disk is arranged on the former, which ring disk is slidable over the former and extends between the first and the second radius. At the beginning of the method, such a ring disk can prevent the mass pumped into the annular gap from being distributed in an uncontrolled manner into the annular gap and, during the movement of the former along the tube, while the mass is pumped into the annular gap, be pushed by the mass along the former, preferably while maintaining one position on the pipe wall. Such a ring disk can subsequently be removed, but preferably remain at one end of the hardened mass.

A ring disk is preferably arranged in the area of the former between a spacer and its second end, which is opposite the first end, so that the ring disk can move relative to the former towards its second end and beyond when the former is moved along the tube.

The hardenable mass is preferably made of a base mixture, to which a starter is added and mixed into it. Preferably, the base mass is pumped by means of a first delivery pipe in a metered manner into a mixer, which is connected to the feed line, and a starter is pumped by means of a second delivery pipe into the mixer. The mixer is preferably a static mixer.

The feed line resp. sub-feed lines forming the feed line, can have a cross-section that is smaller than the annular gap between the first and second radius, so that the hardenable mass is pumped with a short residence time resp. a high flow speed into the annular gap between the former and the pipe wall. Alternatively, the feed line resp. the sub-feed lines can have a cross-section, which is greater than the annular gap between the first and the second radius, so that the hardening reaction can partially occur already in the feed line resp. in the sub-feed lines. For example, the mass can be adjusted in such a manner that it has a total reaction time until reaching the inherent stability (mold release time) of 5 min, and the cross-section of the feed line resp. the sub-feed lines allows a residence time of 30% of the mold release time, so that the remaining duration of the hardening runs until inherent stability is reached, while the mass is held by the former against the pipe wall. The hardening time of the mass can be adjusted by a man skilled in the art in such a manner that the mass reaches inherent stability in the time period within which the mass reaches the second end of the former, e.g. in a time period, in which the former is moved along the pipe wall over a way, which corresponds to its own length longitudinally with respect to the pipe wall. The hardenable mass is preferably a self-hardenable mass, since it hardens without any effect of irradiation or heat.

The sealing edge arranged at the first end of the former, in particular its section, which is in the first radius, is preferably made of an elastic material. Alternatively or additionally, the sealing edge can be inclined towards the second end, for example, be arranged with increasing radius closer to the second end. In this manner, the sealing edge can be pressed against the pipe wall by mass pumped into the annular gap in order to seal the annular gap at the first end of the former. Preferably, the former has a pressure sensor at its first end and the feeding of the hardenable mass is controlled so as to reach a predetermined minimum pressure in the annular gap. In this manner, the method is suitable, in the case of outflow of hardenable mass through the pipe wall, to pump enough mass through the feed line until the annular gap is fully filled with hardenable mass. Such a pressure sensor can e.g. be formed as a strain gauge on the feed line or on the former.

The device preferably allows a method for producing a pipe lining, in which the pipe to be lined is accessible only from one end. For the device can be inserted from one end of the pipe thereinto over the length to be lined and, during the method for producing the pipe lining, moved to the same end of the pipe. Therein, the device is inserted with its second end ahead over the length to be lined into the pipe to be lined. For the insertion of the device into the pipe to be lined from one end only, a pushing rod or a motorized pushing device can be used.

Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale.

In the figures, the same reference numerals designate elements having the same function. FIG. 1 shows different variants of the device in a section along the longitudinal axis 1 of the pipe and of the coaxially arranged device on both sides of the longitudinal axis 1. The former 2 is formed cylindrical, respectively, and generally has a forming surface 3, which corresponds to the shape of the pipe wall 4 with a spacing. This spacing is the spacing between the first radius 5, in which the forming surface 3 is arranged, from the second radius 6, in which the sealing edge 7 is arranged. The second radius 6 is, at least while carrying out the method, equal to the inner radius of the pipe wall 4. For pipes with a round internal cross-section, the forming surface 3 is preferably cylindrical. The former 2 resp. its forming surface 3 is circumferentially closed, so that, in the method, an annular gap 8 is formed between the pipe wall 4 arranged in the second radius 6 and the forming surface 3 arranged in the first radius 5. At least one spacer 9, which preferably extends up into the second radius 6, protrudes over the forming surface 3. During the movement along the longitudinal axis 1, the sealing edge 7 and the at least one spacer 9 hold the former 2 in an approximately constant spacing from the pipe wall 4, so that the hardenable mass pumped into the annular gap 8 is formed into the cross-section of this annular gap 8 and hardens therein. Preferably, at least three spacers 9 are arranged in a distributed manner around the circumference of the former 2 resp. the forming surface 3. At the first end 10, the device has a wall 11a, which extends from the former 2 up to the sealing edge 7 in order to close the annular gap 8 at the first end 10. For pumping of hardenable mass onto or on the forming surface 3 resp. into the annular gap 8, the device has at least one feed line 12, which discharges on the forming surface 3 and/or on the wall 11a. While carrying out the method, the device is moved along its longitudinal axis 1 with the first end 10 ahead along the longitudinal axis 1 of the pipe wall 4 resp. of the former 2 (direction of movement 13). For this movement, the device has e.g. a traction means 14.

The wall 11a can be inclined with increasing radius against the second end 15 opposite the first end 10, so that by pumping hardenable mass into the annular gap 8 the wall 11a and thus the sealing edge 7 can be loaded against the pipe wall 4 resp. against the hose sleeve 20 arranged on the pipe wall 4. The annular gap 8 is open at the second end 15, so that the hardenable mass is left behind by the device while moving the device with the first end 10 ahead. The hardenable mass is adjusted in such a manner that, up to the time, when it exits the device at its second end, it has a strength, which is sufficient for its inherent stability. Preferably, the hardenable mass is still sufficiently flowable when flowing around the spacer 9 to then subsequently merge resp. form a continuous phase, which is in particular circumferentially closed resp. water-proof. In general, the wall 11 resp. the sealing edge 7 arranged thereon is arranged in the second radius 6. The forming surface 3 of the former 2 is arranged in the first radius, which is smaller than the second radius, in which the sealing edge 7 is arranged, e.g. when it abuts against the pipe wall 4, in particular against the pipe wall 4 resp. against the hose sleeve 20 and is slidable along the pipe wall 4 resp. along the hose sleeve 20. Preferably, the spacers 9 extend up into the second radius. The pipe wall 4 has a radius, which is equal to the second radius 6.

An exemplary mass consists of the reactive resin with 100 parts by weight reactive Bisphenol A/F diluted epoxy resin (laminating resin, available as Epikure 240), 100 parts by weight of silica, 5 parts by weight of hydrophobic pyrogenic silicic acid (available as Aerosil R202, Evonik GmbH), 1 part by weight of titanium dioxide (available as Kronos 2056, Kronos Titan GmbH), which is mixed in the mixer with the hardener composition of 12.8 parts by weight of 3,6-diazaoctane-1,8-diamine, 5.1 parts by weight of epoxy resin (available as Epikote 828LVEL, Momentive Specialty Chemicals Inc.), 3 parts by weight nonylphenol, 12.8 parts by weight of silica sand F32 (available from Quarzwerke) and 0.77 part by weight of pyrogenic silicic acid, post-processed with polydimethyl siloxane (available as Aerosil 202, Evonik GmbH).

The shown embodiment of the device has a pressure sensor P, which registers the pressure that is exerted adjacent to the former by the hardenable mass. The measurement signal of the pressure sensor P, which is preferably displayed outside the pipe for an operator, serves to monitor the sufficient pumping of hardenable mass into the annular gap, resp. displays the escape of hardenable mass through holes in the pipe wall 4 resp. in the hose sleeve 20 by dropping pressure. Preferably, the measurement signal of the pressure sensor P is used to control the pumping of the hardenable mass resp. of its constituents in order to maintain a predetermined pressure of the hardenable mass at least at the first end 10.

FIG. 1 in the lower portion shows a variant of the device, in which the wall 11b arranged at the first end 10 extends radially from the former 2 and the feed line 12 discharges into this wall 11b. The spacer 9 is fitted with a travelling wheel 16 leading to reduction of the friction of the spacer 9 along the pipe wall 4.

Generally, the traction means 14 is formed by the at least one feed line 12, such as is shown in lower FIG. 1.

A ring disk 21 surrounds the former 2 and is slidable along the forming surface 3, preferably frictionally engaged. The ring disk 21 extends into the second radius 6 over the forming surface 3, so that the ring disk can abut on the pipe wall 4 and covers the cross-section of the annular gap 8 towards the second end 15 of the former 2. Upon filling the annular gap 8 by pumping hardenable mass into it, the ring disk 21 is pushed along the former 2 over its second end 15, wherein the ring disk 21 can adhere to the hardenable mass.

Figure 2:
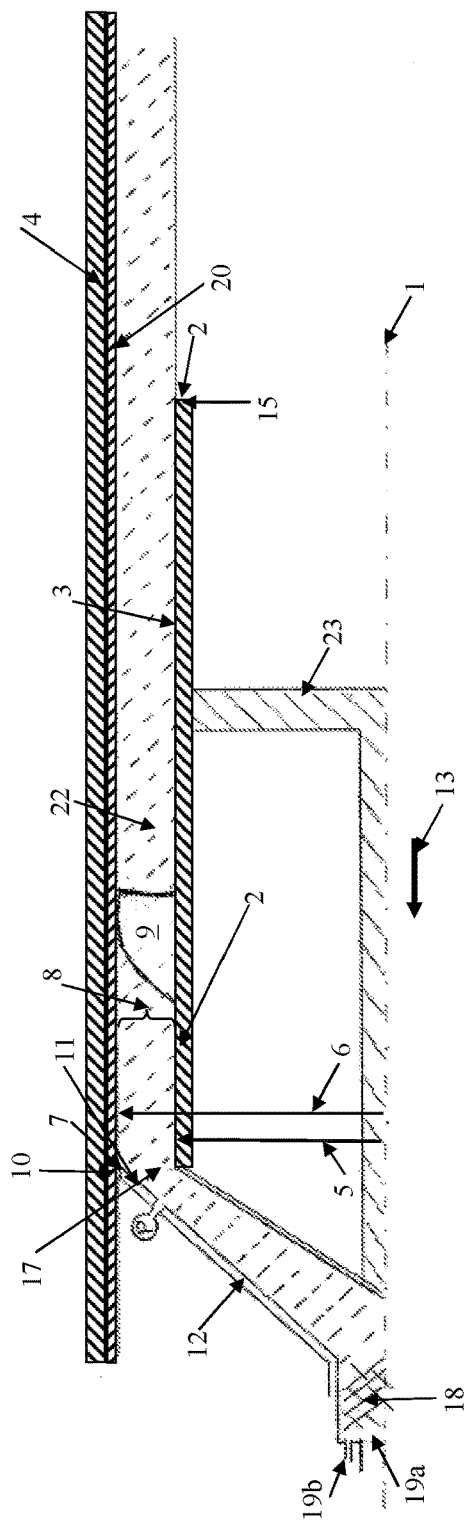

FIG. 2 shows the device and the method in a variant, in which the at least one feed line 12 discharges into an annular outlet 17, the wall of which forms the sealing edge 7. As shown, the pressure sensor P can be connected to the feed line in the area of the outlet 17.

Ahead of the feed line 12 a mixer 18 is arranged, to which, in turn, delivery pipes 19 are connected for the constituents of the hardenable mass, e.g. a first delivery pipe 19a for the hardenable mass, which, however, contains no starter, as well as a second delivery pipe 19b for the starter. By means of the mixer 18, which is fed with the components for the hardenable mass via the delivery pipes 19a, 19b, the components are mixed and thereby the hardening reaction is started. In this manner, a rapidly hardening mass can be produced and conducted through the feed line 12 with a short residence time into the annular gap 8, in which during the movement of the former 2 along the pipe wall 4 the mass achieves inherent stability when the second end 15 of the former 2 is moved over it.

The pressure sensor P can generally be connected to the at least one feed line, e.g. on the delivery pipe 19a for hardenable mass, which contains no starter, before or after the addition of a starter, e.g. before or after a mixer.

To reduce the adherence of the hardenable mass on the device, their surfaces, which come into contact with the hardenable mass, in particular the forming surface 3 and the wall 11, are coated with a separating agent, e.g. wax, in particular solid paraffin, or polytetrafluorethylene (Teflon).

Figure 3:
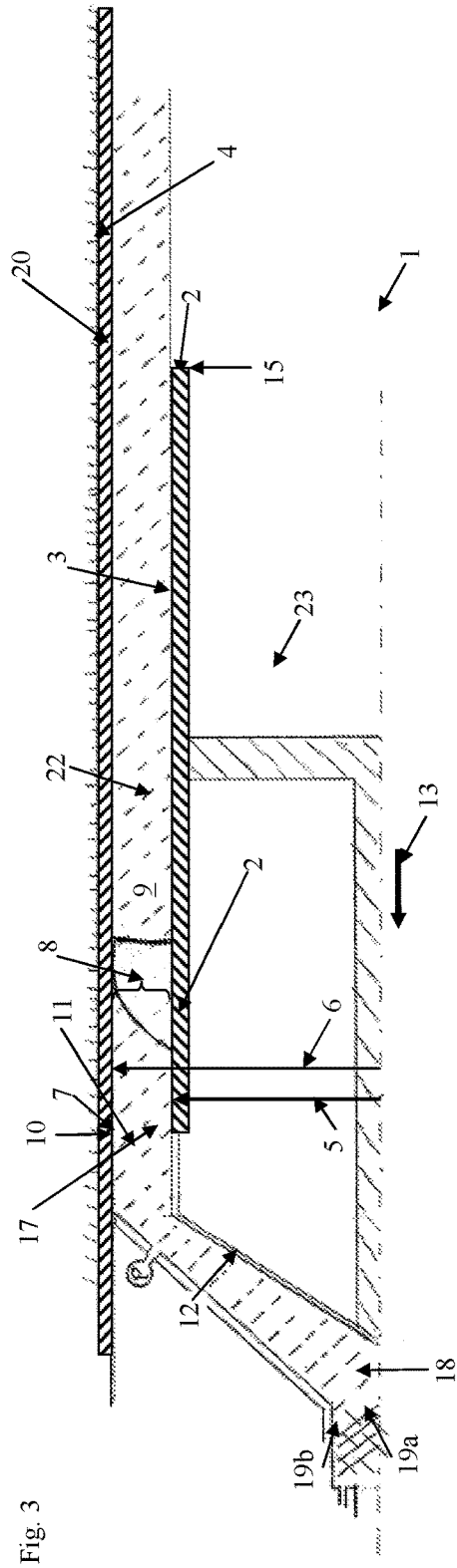

FIG. 3 shows the method, wherein, prior to producing the pipe lining from a hardenable mass 22, the hose sleeve 20 is arranged against the pipe wall 4. The hose sleeve 20 can abut on the pipe wall 4 or be arranged to it with a spacing. The hose sleeve 20 can be pulled into the pipe or put in outside-inward, wherein the hose sleeve 20 is impinged on the inner side with pressure, e.g. air pressure, and put over in the pipe to be lined. When the hose sleeve 20 is present in the pipe, the pipe lining is produced in the hose sleeve 20 as previously described, so that the hose sleeve is arranged between the pipe lining and the pipe wall 4. Therein, the hose sleeve 20 is pressed against the pipe wall 4 by the device, in particular by the sealing edge 7 and the spacers 9 resp. by the hardenable mass pumped into the annular gap 8. This embodiment has the advantage of covering breakthroughs of the pipe wall 4 by means of the hose sleeve 20, so that the hardenable mass to a lesser extent flows out from the annular gap 8 into breakthroughs of the pipe wall 4.

FIGS. 2 and 3 show a support 23 arranged within of the former, which support supports the former 2 against the first radius 5. Such a support, which can be preferably arranged in the axial area of the former between the spacer 9 and the second end 15 of the former 2, is optionally formed spring-loaded.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. Method for manufacturing a pipe lining in a pipe by introducing a hardenable mass, comprising inserting a hose sleeve into the pipe abutting or with a spacing to a pipe wall of the pipe, placing a former within the pipe and pumping the hardenable mass through at least one outlet into an annular gap defined between the hose sleeve and a forming surface of the former, wherein said placing comprises arranging a slidable ring over the former, wherein the slidable ring is pushed by the hardenable mass along the former during said pumping, wherein the former is moved along its longitudinal axis with its first end ahead along the pipe wall, wherein before the introduction of the hardenable mass into the pipe, the hose sleeve is inserted into the pipe.

2. Method according to claim 1, wherein the former comprises a sealing edge at the first end, the sealing edge slidably engaging the hose sleeve.

3. Method according to claim 1, wherein the former comprises a spacer that engages the hose sleeve to maintain the annular gap between the hose sleeve and the forming surface.

4. Method according to claim 3, wherein the former comprises a plurality of spacers arranged such that the hardenable mass can flow around the spacers during the movement of the former along the pipe and the hardenable mass can subsequently merge after flowing around the spacers.

5. Method according to claim 1, wherein the hardenable mass hardens during the movement of the former until reaching a second end of the former opposite the first end up to an inherent stability, which closes the annular gap at the second end and without the former maintains the cross-section of the annular gap.

6. Method according to claim 1, wherein the hardenable mass has a content of inert filler of at least 30% by volume in relation to its reactive constituents.

7. Method according to claim 1, wherein the pumping comprises supplying constituents of the hardenable mass without starter and starter of hardenable mass by separate delivery pipes to a mixer, to which a feed line connected with the at least one outlet is connected.

8. Method according to claim 1, wherein said pumping comprises determining pressure of the hardenable mass with a pressure sensor and controlling supply of the hardenable mass into the annular gap to reach a predetermined minimum pressure in the annular gap.

9. Method according to claim 1, wherein said placing comprises inserting the former from one end of the pipe over the length to be lined.

\* \* \* \* \*